US012280873B2

(12) United States Patent
Morales Morales et al.

(10) Patent No.: US 12,280,873 B2
(45) Date of Patent: Apr. 22, 2025

(54) PORTABLE ELECTRONIC DEVICE HOLDER FOR SEAT

(71) Applicant: Safran Seats USA LLC, Gainesville, TX (US)

(72) Inventors: David Morales Morales, Chihuahua (MX); Daniel A. Chavarria Garcia, Chihuahua (MX); Rodolfo Nevarez Gonzalez, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 223 days.

(21) Appl. No.: 17/617,776

(22) PCT Filed: Jun. 27, 2019

(86) PCT No.: PCT/US2019/039559
§ 371 (c)(1),
(2) Date: Dec. 9, 2021

(87) PCT Pub. No.: WO2020/263266
PCT Pub. Date: Dec. 30, 2020

(65) Prior Publication Data
US 2022/0234739 A1    Jul. 28, 2022

(51) Int. Cl.
| | |
|---|---|
| *B64D 11/00* | (2006.01) |
| *B60N 3/00* | (2006.01) |
| *B60R 11/00* | (2006.01) |
| *B60R 11/02* | (2006.01) |
| *B64D 11/06* | (2006.01) |

(52) U.S. Cl.
CPC ........ *B64D 11/00152* (2014.12); *B60N 3/004* (2013.01); *B60R 11/0241* (2013.01); *B60R 11/0252* (2013.01); *B64D 11/06* (2013.01); *B60R 2011/0015* (2013.01);
(Continued)

(58) Field of Classification Search
CPC ...... B64D 11/00152; B60R 2011/0015; B60N 3/004
See application file for complete search history.

(56) References Cited

U.S. PATENT DOCUMENTS

2011/0278885 A1* 11/2011 Procter ............ B64D 11/00153
297/135
2014/0138419 A1* 5/2014 Minn ................... F16M 11/105
224/567
(Continued)

FOREIGN PATENT DOCUMENTS

CN     106740533 A  *  5/2017
CN     107487273 A     12/2017
(Continued)

OTHER PUBLICATIONS

International Patent Application No. PCT/US2019/039559, International Search Report and Written Opinion, dated Mar. 5, 2020.

*Primary Examiner* — Timothy J Brindley
(74) *Attorney, Agent, or Firm* — Kilpatrick Townsend & Stockton LLP (57) ABSTRACT

A portable electronic device holder for a passenger seat includes a base plate, a back plate pivotally attached to the base plate, and at least one movable arm attached to the back plate. The back plate may be adjustable relative to the base plate over a range of approximately 0° to 90°.

18 Claims, 10 Drawing Sheets

(52) U.S. Cl.
CPC ............... *B60R 2011/0071* (2013.01); *B60R 2011/008* (2013.01); *B60R 2011/0276* (2013.01)

(56) References Cited

U.S. PATENT DOCUMENTS

| | | | |
|---|---|---|---|
| 2014/0311388 A1* | 10/2014 | Korpi | A47B 23/043 108/162 |
| 2015/0108798 A1* | 4/2015 | Boyer, Jr. | B60R 11/0252 297/188.05 |
| 2016/0257404 A1* | 9/2016 | Ferris | F16M 13/022 |
| 2016/0280376 A1* | 9/2016 | Pozzi | B64D 11/00152 |
| 2017/0029114 A1 | 2/2017 | Hérault | |
| 2018/0001835 A1* | 1/2018 | Corso | B60N 3/103 |
| 2018/0111567 A1* | 4/2018 | Frazier | B60R 11/0252 |
| 2018/0354398 A1* | 12/2018 | Lamb | F16M 11/041 |
| 2019/0176989 A1 | 6/2019 | Flores Aguirre et al. | |
| 2020/0109812 A1* | 4/2020 | Yang | F16M 13/022 |
| 2020/0326749 A1* | 10/2020 | Del Moral | A45C 11/00 |
| 2020/0361396 A1* | 11/2020 | Fox | B60R 11/0241 |

FOREIGN PATENT DOCUMENTS

| | | | | |
|---|---|---|---|---|
| CN | 111147646 A | * | 5/2020 | |
| CN | 114368483 A | * | 4/2022 | |
| EP | 2650217 A1 | | 10/2013 | |
| EP | 2746158 A1 | * | 6/2014 | ......... B64D 11/0015 |
| FR | 2959188 A1 | * | 10/2011 | ........... F16M 11/041 |
| FR | 2982218 A1 | | 5/2013 | |
| FR | 3045530 A1 | | 6/2017 | |
| WO | WO-0002745 A1 | * | 1/2000 | ............. B60N 3/004 |
| WO | WO-2007123615 A1 | * | 11/2007 | ........... A47B 23/043 |
| WO | 2016092509 A1 | | 6/2016 | |
| WO | 2018151664 A1 | | 8/2018 | |
| WO | WO-2020089423 A1 | * | 5/2020 | ............. B60N 3/004 |

* cited by examiner

PORTABLE ELECTRONIC DEVICE HOLDER FOR SEAT

FIELD OF THE INVENTION

The field of the invention relates to additive manufactured components for passenger seats in aircraft or the like.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and/or arm rests of the passenger seats.

With the advent of portable electronic devices ("PEDs"), such as tablet computers, mobile phones, smart phones, handheld video game systems, portable digital assistants, palmtop computers, DVD players, data and audio-video media, multi-media enabled devices, laptop computers, and other similar electronic devices, many passengers prefer to use their own PEDs, rather than the OBE or IFE components that are mounted in the passenger seats.

The rate at which PEDs, namely mobile phones, tablets, portable computers, personal digital assistants ("PDAs"), have been evolving has been exponential. These devices are constantly increasing in functions and decreasing/altering in size, making them more portable and at the same time able to perform more tasks. This evolution has led to passengers carrying their personal information and media on these devices with the expectation of using them while traveling.

To this point, there have been very few examples of the integration of these PEDs into airplane seats in any specific way to the seat, other than providing a location on a tray table, such as a groove to hold the PED, and sometimes a power connection to charge them. Conventional mounting locations are in the tray table, which must be stowed during certain times during flight.

There is a need for passengers to have a way to hold or store these PEDs while in flight in a manner that allows the PEDs to be used and enjoyed at any given moment. In some cases, it may be desirable to provide a way for passengers to connect their PEDs to the OBE or IFE systems, so that they may use their own PEDs in lieu of the OBE or IFE systems. In other cases, it may be desirable to provide a way for passengers to connect their PEDs to the OBE or IFE systems to use in conjunction with the system's video display or to receive power for their PEDs or otherwise. Some conventional seats include provisions for PEDs located behind the tray table, which limits the availability of such features to times when the tray table is deployed. In addition, provisions located behind the tray table may not be ergonomically suited to small or large passengers.

As a result, there is a need for a holder assembly and interface system for PEDs that is always available (regardless of whether the tray table is deployed) and adaptable to a wide range of passengers (and to a range of PED sizes, shapes, and thicknesses, and that does not create the need for an extra components or adapters). Such a solution eliminates the need for airlines to provide a large number of cases/adapters, which represents additional weight and the need for additional storage space, as well as eliminating the costs for passengers to purchase an additional case/adapter for his or her PED. Such a solution also allows passengers to use their PEDs with or without a case, and to make the tray tables available for meals, documents, or any other object, or to allow passengers to stow the tray tables while still having the PEDs securely placed for use, charging, and/or viewing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a portable electronic device holder for a passenger seat comprises: a base plate; a back plate pivotally attached to the base plate; and at least one movable arm attached to the back plate, wherein the back plate is adjustable relative to the base plate over a range of approximately 0° to 90°.

The portable electronic device holder, in certain embodiments, comprises a stowed configuration and a deployed configuration.

In certain embodiments, the at least one movable arm folds relative to back plate to reduce a thickness of the portable electronic device holder in the stowed configuration.

In some embodiments, in the stowed configuration, the base plate and the back plate are approximately parallel to one another.

In some embodiments, the base plate is attached to the passenger seat.

The attachment between the base plate and the passenger seat, in certain embodiments, comprises a rotational joint such that, in the stowed configuration, the portable electronic device holder is folded flat against a surface of a seatback of the passenger seat.

A forward edge of the base plate, in some embodiments, comprises an upstanding lip.

In some embodiments, the at least one movable arm is attached to an upper edge of the back plate.

In certain embodiments, the at least one movable arm slides along a width of the back plate.

In some embodiments, the at least one movable arm comprises an inner surface with a varying width such that the at least one movable arm is narrower at a proximal end to the back plate.

The at least one movable arm, in certain embodiments, comprises two movable arms that each slide along an upper edge of the back plate.

According to certain embodiments of the present invention, a passenger seat comprises: a seat back; and a portable electronic device holder comprising: a base plate attached to the seat back; a back plate pivotally attached to the base plate; and at least one movable arm attached to the back plate, wherein an angle of the back plate is adjustable relative to the base plate.

In some embodiments, the portable electronic device holder comprises a stowed configuration and a deployed configuration.

The at least one movable arm, in certain embodiments, folds relative to back plate to reduce a thickness of the portable electronic device holder in the stowed configuration.

In certain embodiments, in the stowed configuration, the base plate and the back plate are approximately parallel to one another.

In some embodiments, the attachment between the base plate and the passenger seat comprises a rotational joint such that, in the stowed configuration, the portable electronic device holder is folded flat against a surface of a seatback of the passenger seat.

A forward edge of the base plate, in certain embodiments, comprises an upstanding lip.

In certain embodiments, the at least one movable arm is attached to an upper edge of the back plate.

In some embodiments, the at least one movable arm slides along a width of the back plate.

The at least one movable arm, in certain embodiments, comprises an inner surface with a varying width such that the at least one movable arm is narrower at a proximal end to the back plate.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
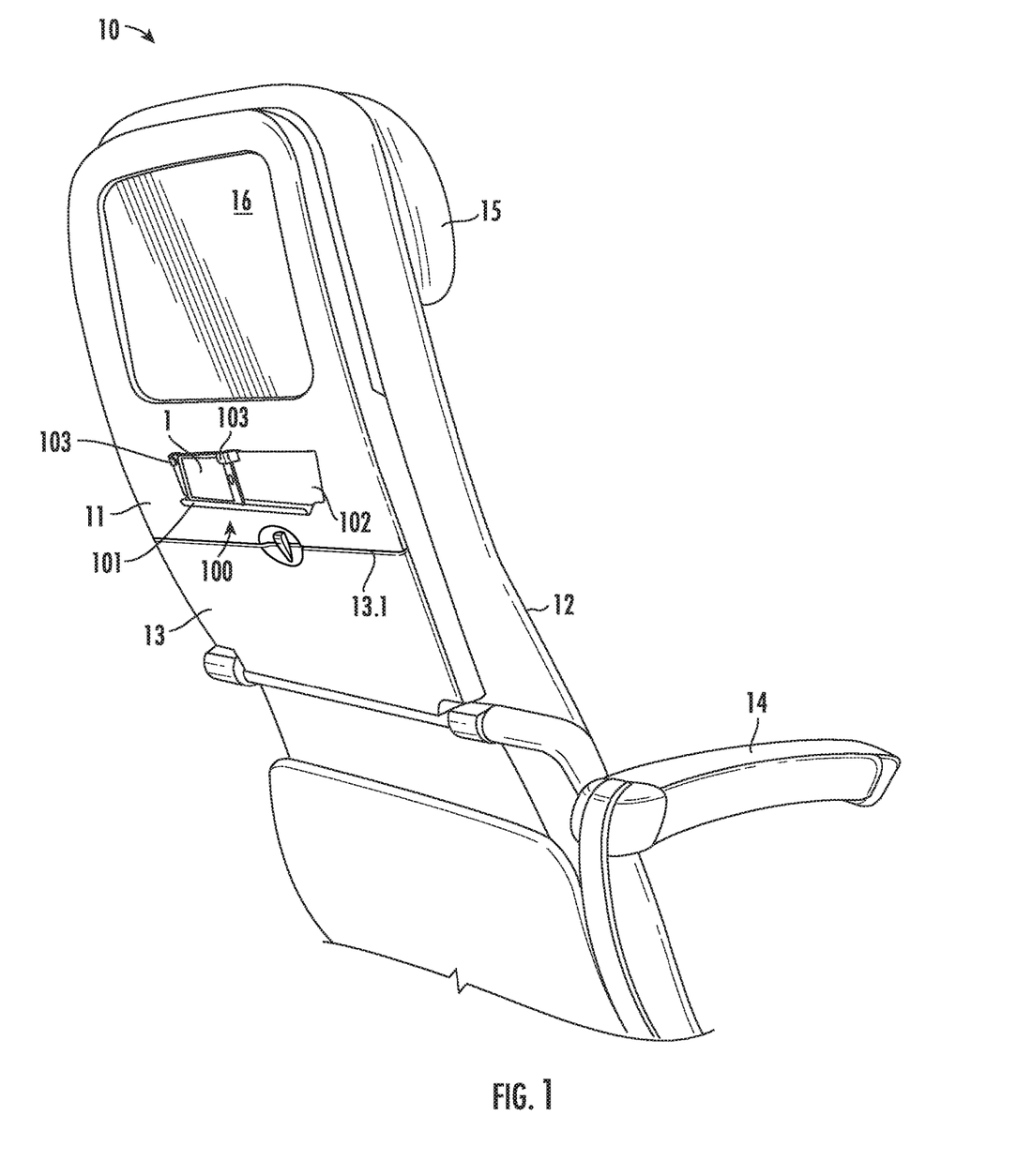
FIG. 1 is a perspective view of a passenger seat with a portable electronic device holder according to certain embodiments of the present invention.

FIG. 1 illustrates exemplary embodiments of passenger seats 10 with a portable electronic device holder 100. FIGS. 2A-5C show examples of portable electronic device holders 100. In some embodiments, a passenger seat 10 includes a rear surface 11, a front surface 12, a lower feature 13 on the rear surface 11, at least one armrest 14, a headrest 15 on the front surface 12, an upper feature 16 on the rear surface 11, and a portable electronic device holder 100 on the rear surface 11. The upper feature 16 may include at least one of a display screen, a storage compartment, a literature pocket, or any other appropriate feature. The lower feature 13 may include at least one of a tray table, a storage compartment, a literature pocket, or any other appropriate feature.

The portable electronic device holder 100, as shown in FIG. 1, may be located on the rear surface 11 of the passenger seat 10. The portable electronic device holder 100 may be located above the lower feature 13 (e.g., a tray table) and below the upper feature 16 (e.g., a display screen). In some embodiments, the portable electronic device holder 100 may be integral to the lower feature 13 such that the portable electronic device holder 100 is located on a rear surface of the lower feature 13 (i.e., below the upper edge 13.1 of the lower feature 13, as shown in FIG. 1). In other embodiments, the portable electronic device holder 100 may be located on the rear surface 11 of the passenger seat 10 behind the lower feature 13. In such embodiments, when the lower feature 13 is a tray table and the tray table is in the stowed configuration (as shown in FIG. 1), the portable electronic device holder 100 would be covered by the tray table and the passenger would be required to open/deploy the tray table to access the portable electronic device holder 100. In other embodiments, the portable electronic device holder 100 may be located in the area of the upper feature 16. For example, when the upper feature 16 is a storage compartment, a literature pocket, or another similar feature, the portable electronic device holder 100 can be integral with or disposed adjacent to the upper feature 16.

The portable electronic device holder 100 may include a base plate 101, a back plate 102 pivotally attached to the base plate 101, and at least one movable arm 103 attached to the back plate 102. In some embodiments, the back plate 102 is adjustable relative to the base plate 101 over a range of approximately 0° to 90°. The axis of rotation for the back plate 102 relative to the base plate 101 is approximately horizontal (i.e., parallel to a floor on which the passenger seat 10 is supported) and is parallel and/or coplanar with the rear surface 11 of the passenger seat 10. As shown in FIGS. 1 and 3A-3D, the at least one movable arm 103 engages the vertical edges of the PED 1 without engaging the top horizontal edge of the PED 1.

The base plate 101 may include an approximately flat upper surface 112 designed to interface with a portion (e.g., an edge) of a PED 1, an upstanding lip 111, a lower surface 113, and a rear attachment 114. In some embodiments, the upstanding lip 111 is located at a forward edge of the base plate 101 and is approximately perpendicular to the upper surface 112 of the base plate 101. The upstanding lip 111 may be designed to engage a portion of the PED 1 and prevent the PED 1 from sliding off a front portion of the base plate 101. For example, when the PED 1 is arranged in a landscape orientation (see FIG. 3A), a side edge of the PED 1 rests on the base plate 101 and the upstanding lip 111 prevents the side edge from sliding off the front portion of the base plate 101. Similarly, when the PED 1 is arranged in a portrait orientation (see FIG. 3B), a bottom edge of the PED 1 rests on the base plate 101 and the upstanding lip 111 prevents the bottom edge from sliding off the front portion of the base plate 101.

Figure 5A:
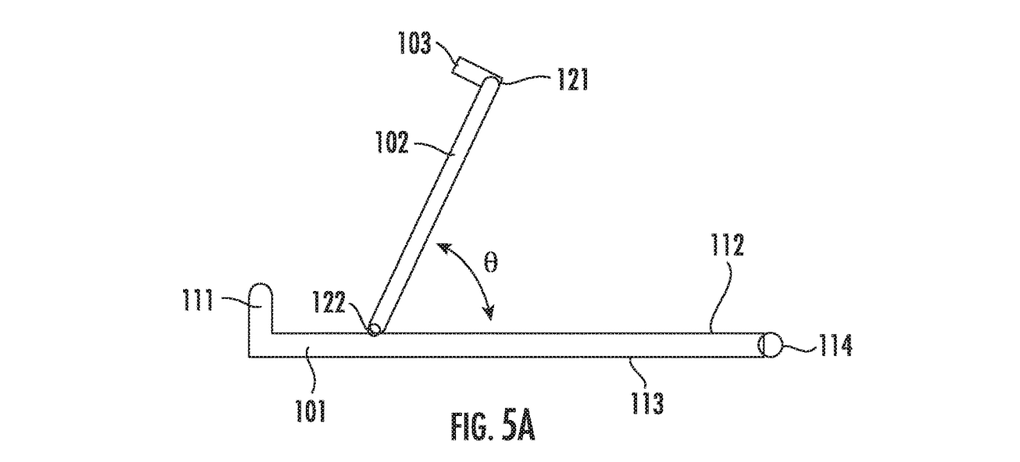
FIG. 5A is a side view of the portable electronic device holder of FIG. 1 in a deployed configuration.

In some embodiments, the back plate 102 may include a pivotable connection 122 to the upper surface 112 of the base plate 101 (see FIGS. 2B and 5A-5C) and the back plate 102 may be positioned/deployed at a number of different angles (see angle θ in FIG. 5A). The angle θ may be adjusted on-the-fly by a passenger to adapt for the passenger's size, posture, and/or seating position to ensure the PED 1 is properly oriented. For example, if the passenger seat 10 is reclined (i.e., due to activity of a passenger in the row forward of the passenger viewing the PED 1), the passenger viewing the PED 1 can adjust angle θ to correct the position of the PED 1.

Figure 2A:
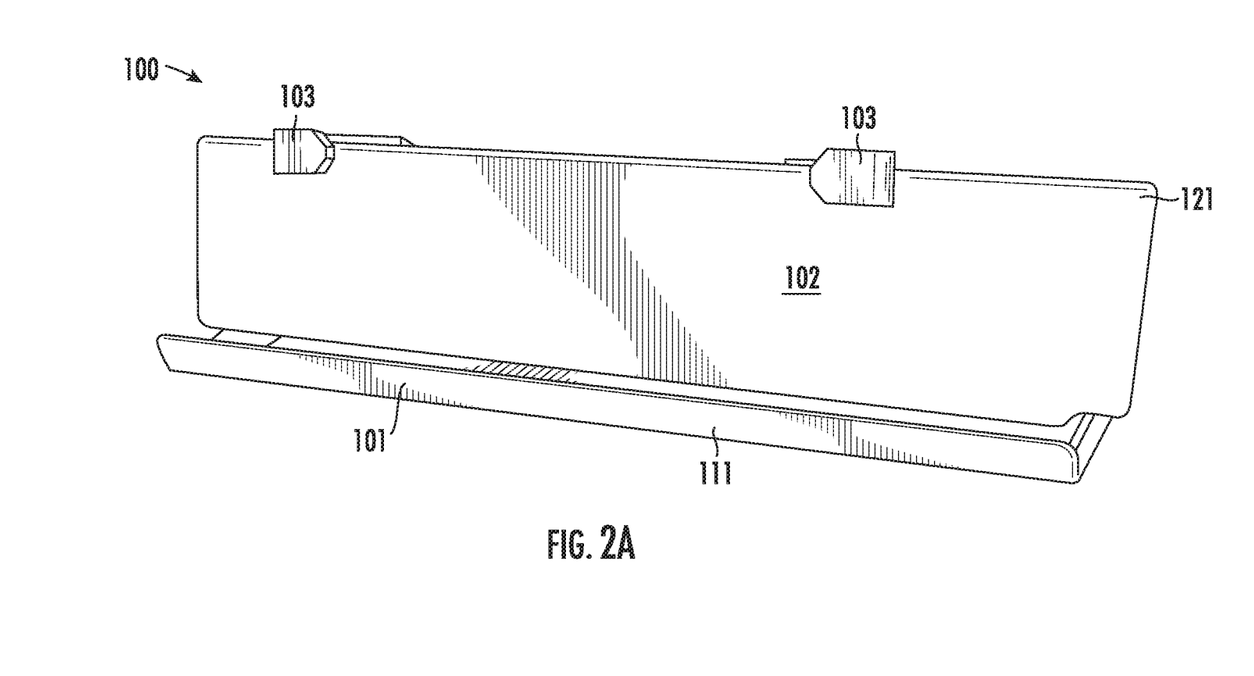
FIG. 2A is a front perspective view of the portable electronic device holder of FIG. 1.
Figure 2B:
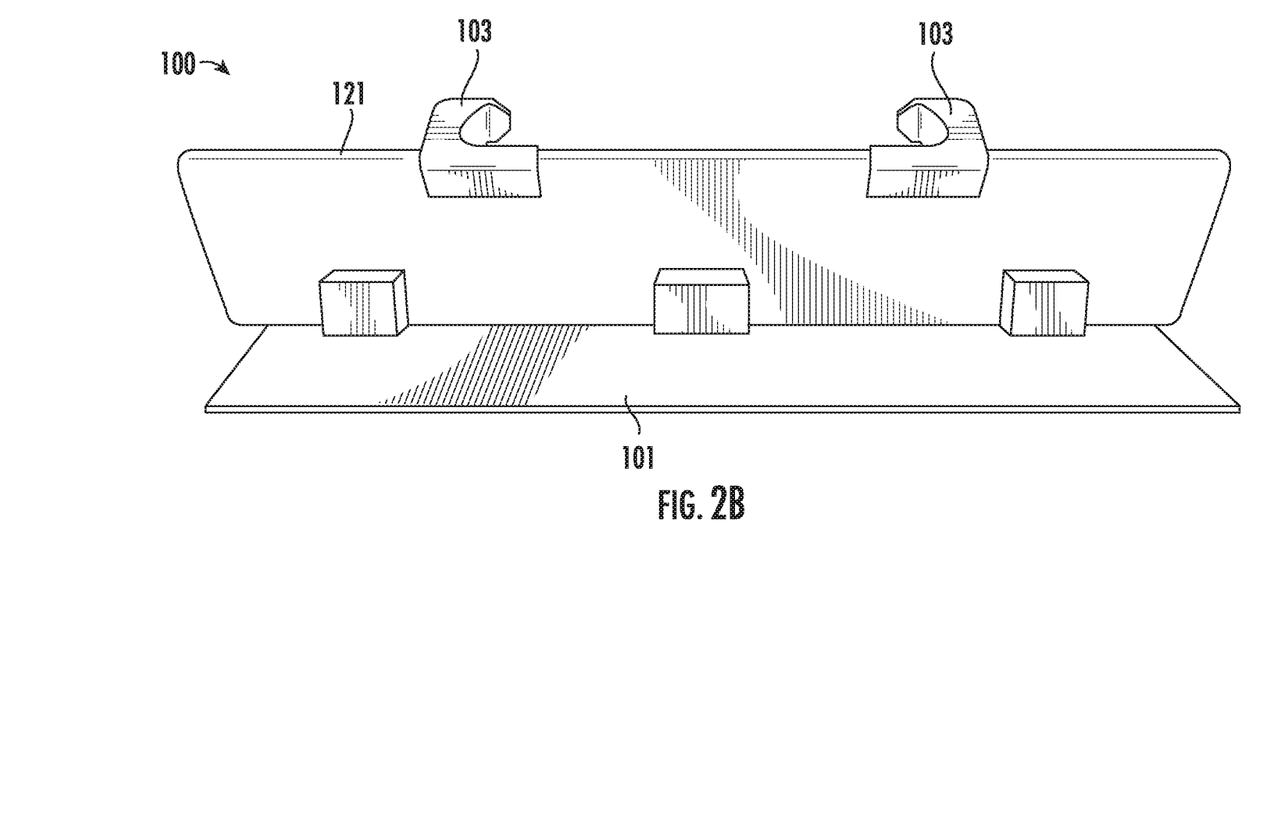
FIG. 2B is a rear perspective view of the portable electronic device holder of FIG. 1.
Figure 2C:
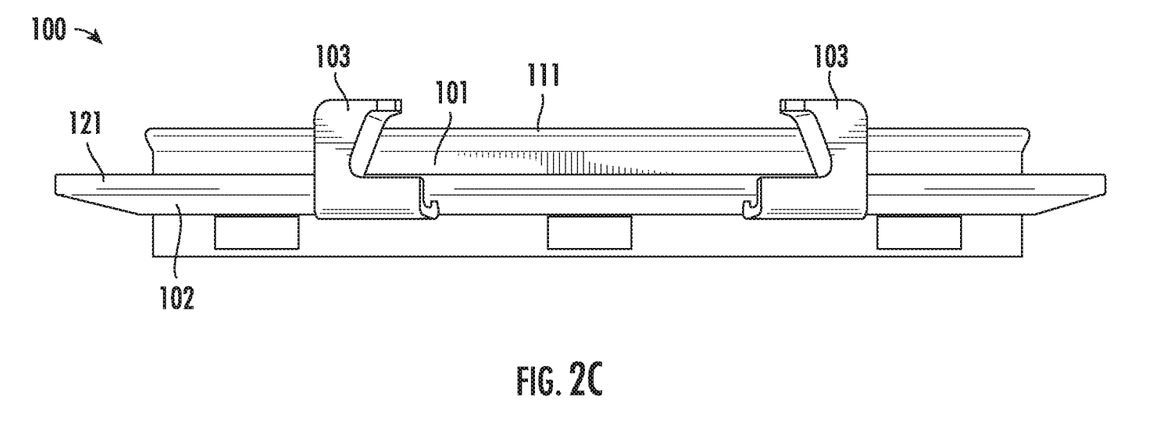
FIG. 2C is a top view of the portable electronic device holder of FIG. 1.

As shown in FIGS. 2A-2C, the at least one movable arm 103 may be attached to an upper edge 121 of the back plate 102. The at least one movable arm 103 may include two or more movable arms 103 where at least one of the movable arms 103 can slide along the length of upper edge 121 to fit a PED 1. In some embodiments, as shown in FIGS. 2A-2C, the portable electronic device holder 100 electronic device holder 100 includes two movable arms 103. In some cases, the left side movable arm 103 (as shown in FIG. 2A) is static while the right side movable arm 103 (as shown in FIG. 2A) can move along the length of the upper edge 121 to fit a PED 1. In other embodiments, both the left and right side movable arms 103 (as shown in FIG. 2A) are moveable along the length of the upper edge 121 to fit a PED 1. The movable arms 103 may be symmetric about a center of the PED 1. In some cases, the movable arms 103 move independently of one another. The upper edge 121 may include at least one stop feature that limits movement of the at least one movable arm 103. For example, the upper edge 121 may include a stop feature near the left and right sides of the back plate 102 (i.e., near each end of the upper edge 121) to prevent the at least one movable arm 103 from disconnecting from the back plate 102.

The at least one movable arm 103 may include an outer lip 131 and an inner surface 132. In some embodiments, the outer lip 131 extends inward toward the other movable arm 103 such that the outer lip(s) 131 retain the PED 1 within the portable electronic device holder 100. The inner surface 132 may be contoured to include an angled and/or a curved surface. In some embodiments, the inner surface 132 is arranged such that the narrowest width between the two movable arms 103 is adjacent to the outer lip 131 and widest width between the two movable arms 103 is adjacent to the back plate 102. In other words, the contours of the inner surface(s) 132 biases the PED 1 toward the back plate 102. The movable arm 103 itself may be narrower at a proximal end to the back plate 102 and wider at the distal end at the outer lip 131. In addition to sliding along the length of the upper edge 121, in some embodiments, the at least one movable arm 103 may be capable of rotating between an extended configuration (see FIG. 4A) and a retracted configuration (see FIG. 4B). For such embodiments, the at least one movable arm 103 may rotate about a hinge 133. In some cases, the depth of the at least one movable arm 103 (i.e., the distance between the surface of the back plate 102 and the outer lip 131) may be sufficient to hold/store two PEDs. Such a configuration may be desired for secure storage, charging purposes, or other appropriate reasons.

Figure 3A:
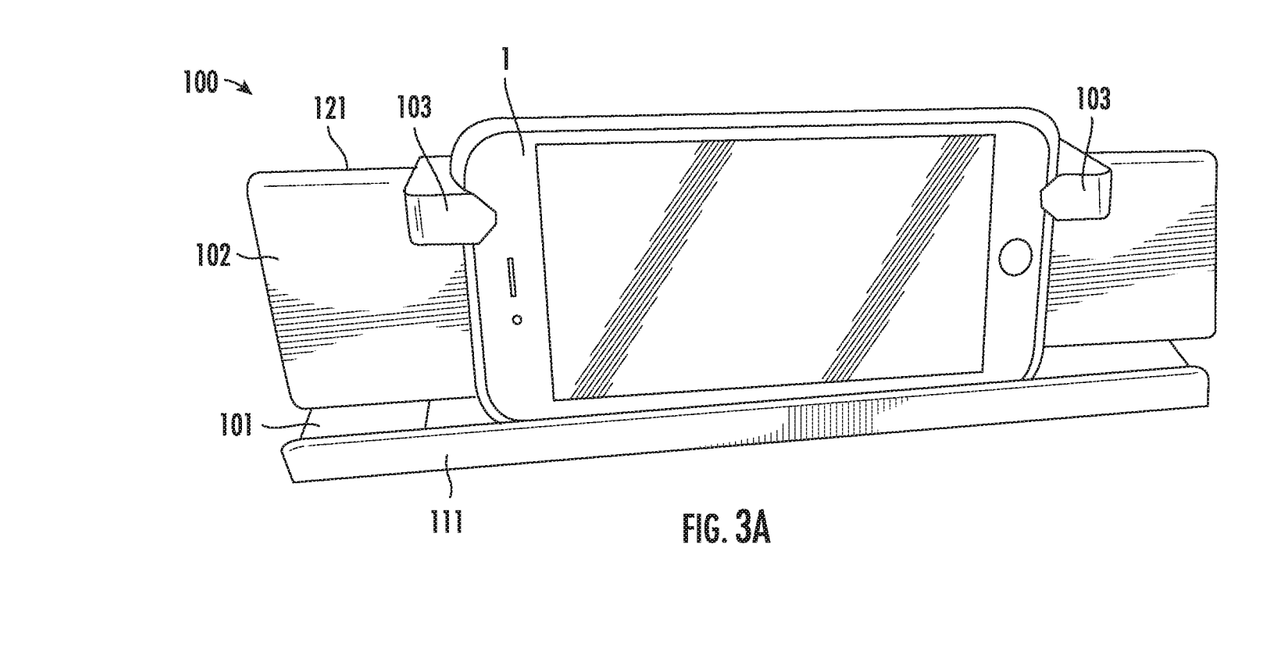
FIG. 3A is a front perspective view of the portable electronic device holder of FIG. 1 with a portable electronic device in a landscape view.
Figure 3B:
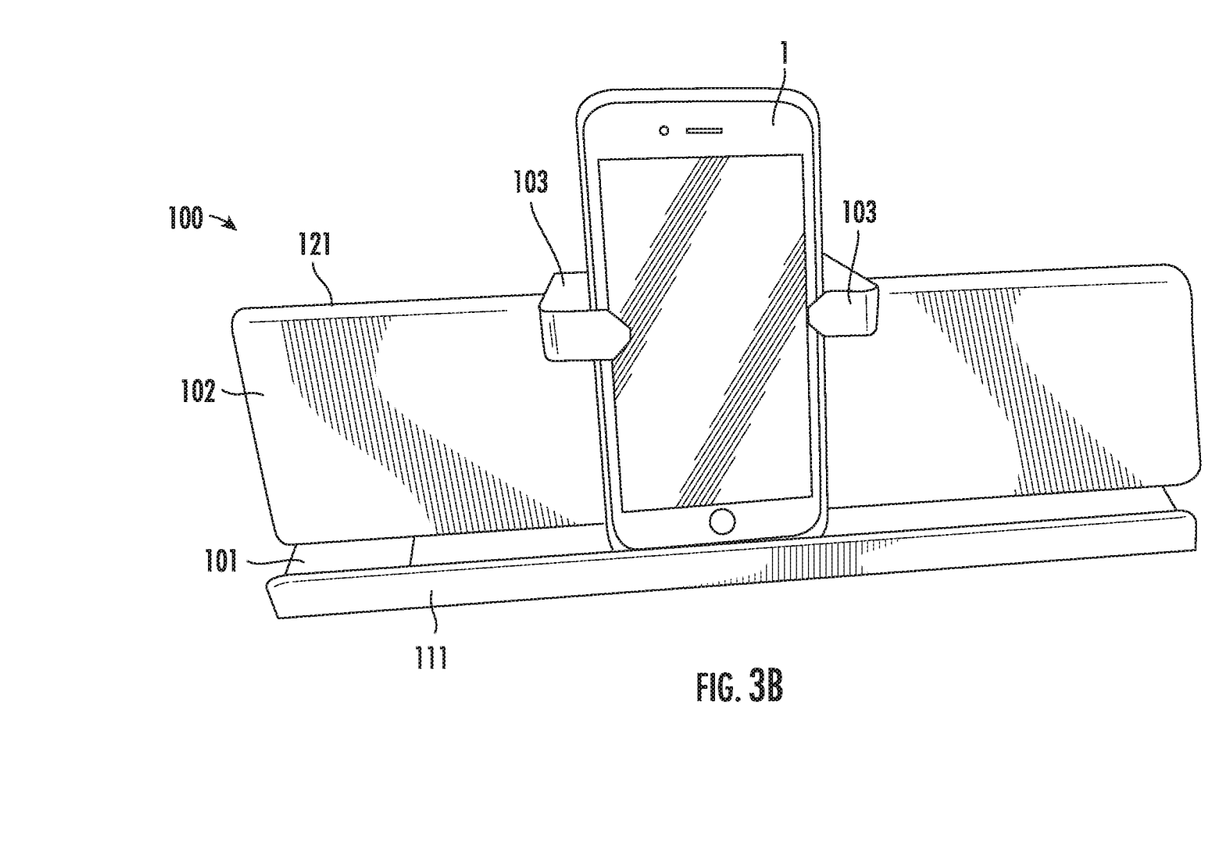
FIG. 3B is a front perspective view of the portable electronic device holder of FIG. 1 with a portable electronic device in a portrait view.
Figure 3C:
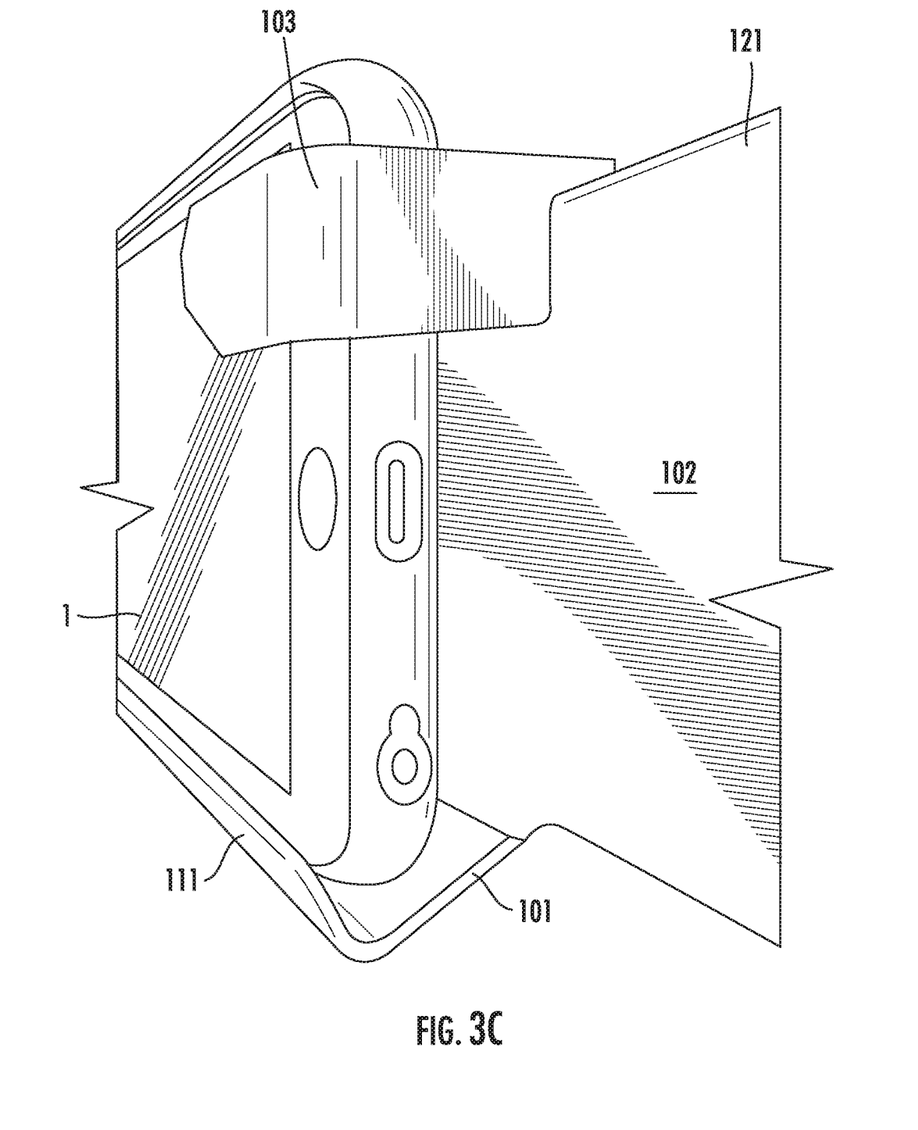
FIG. 3C is a partial perspective view of the portable electronic device holder of FIG. 1 with a portable electronic device in a landscape view.
Figure 3D:
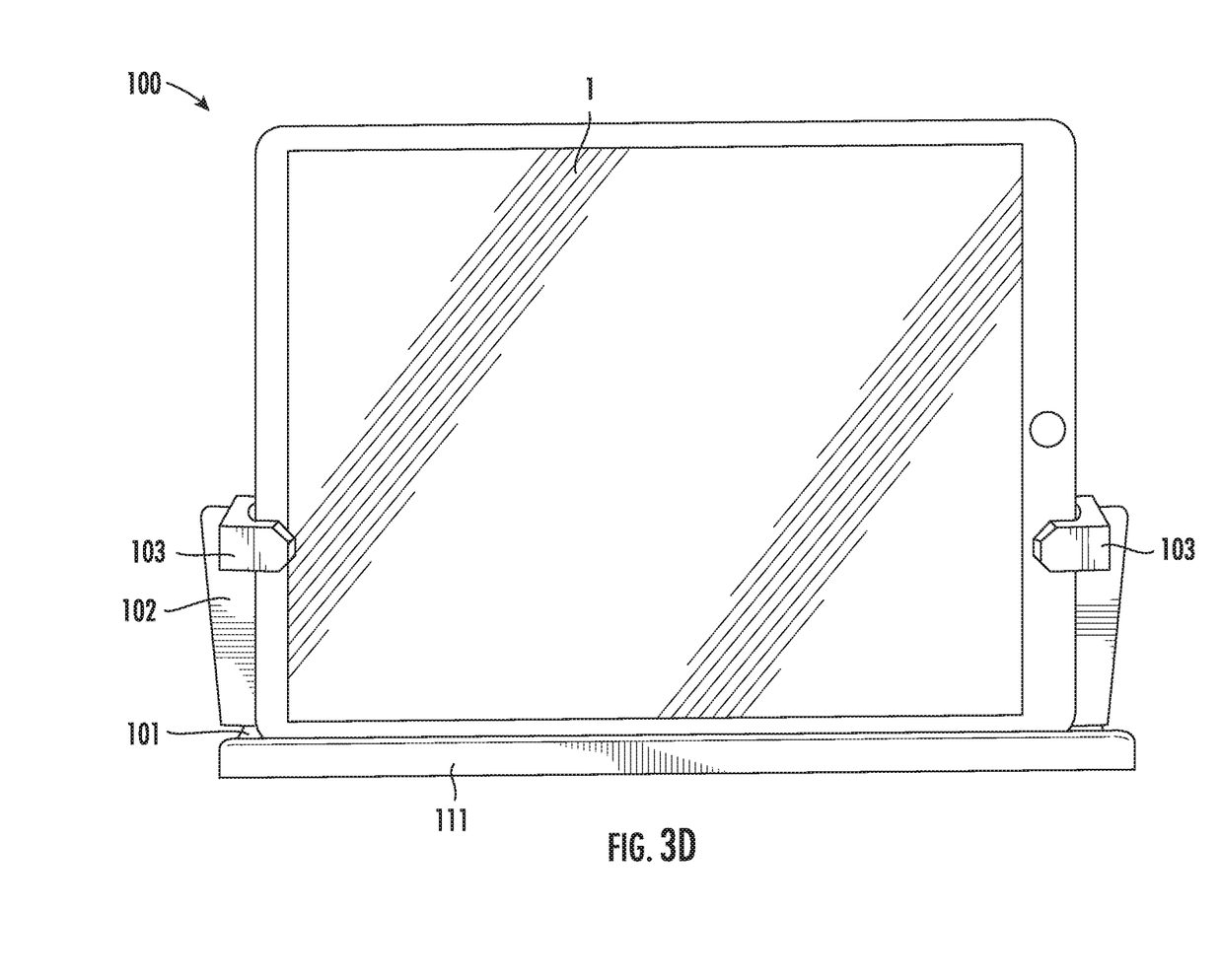
FIG. 3D is a front perspective view of the portable electronic device holder of FIG. 1 with a portable electronic device in a landscape view.
Figure 4A:
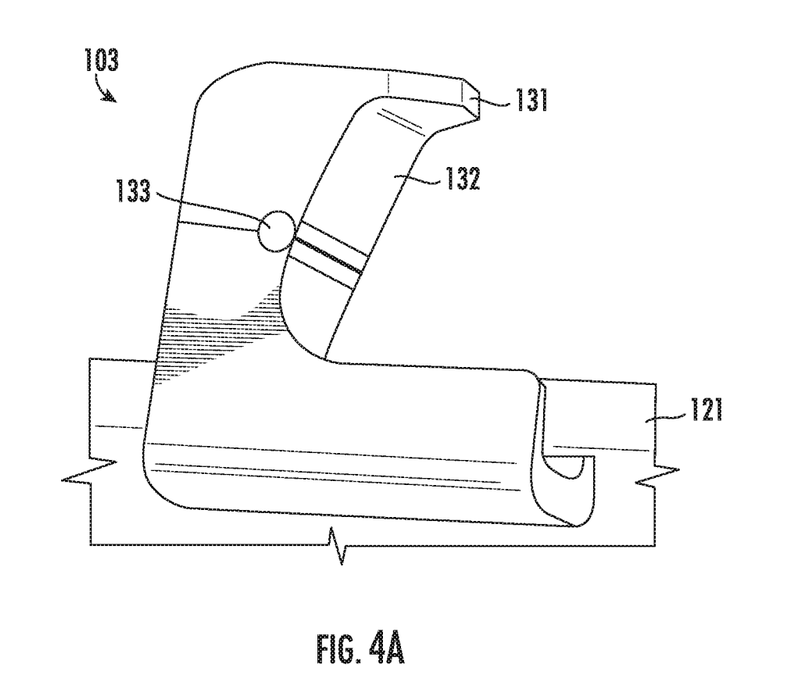
FIG. 4A is a top perspective view of a movable arm of the portable electronic device holder of FIG. 1 in an extended configuration.
Figure 4B:
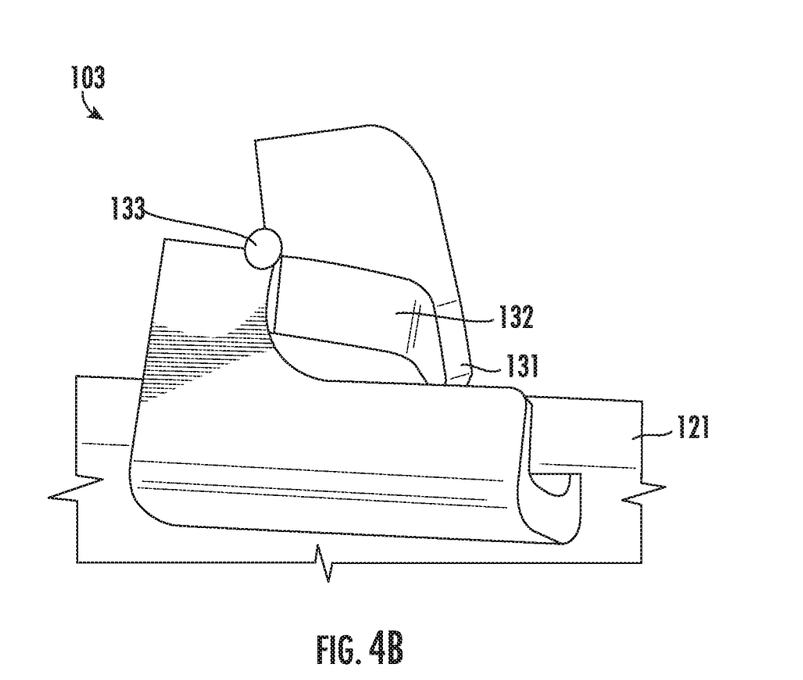
FIG. 4B is a top perspective view of the movable arm of FIG. 4A in a retracted configuration.

As shown in FIG. 3C, the portable electronic device holder 100 is arranged such that various connections and ports of the PED 1 are not obstructed. For example, the at least one movable arm 103 does not block power/charging ports, audio/headphone connectors, or various other connections.

In some embodiments, as shown in FIGS. 3A-3D, the portable electronic device holder 100 may be capable of supporting various sizes of devices including mobile phones (smart phones) and tablets in both portrait and landscape orientations.

Figure 5B:
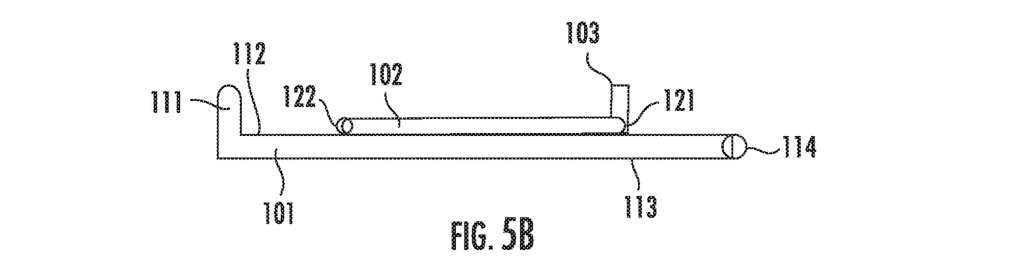
FIG. 5B is a side view of the portable electronic device holder of FIG. 1 in a partially stowed configuration.
Figure 5C:
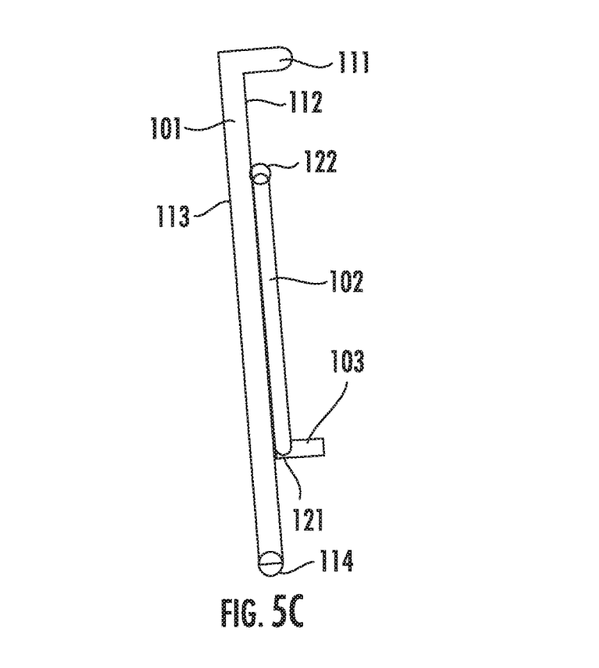
FIG. 5C is a side view of the portable electronic device holder of FIG. 1 in a fully stowed configuration.

The portable electronic device holder 100 may be capable moving between a deployed configuration (see FIG. 5A) and a stowed configuration (see FIG. 5C). In some embodiments, the portable electronic device holder 100 is attached to the rear surface 11 of the passenger seat 10 at rear attachment 114. The base plate 101 may rotate about the rear attachment 114 such that the base plate 101 is approximately horizontal. In the deployed configuration, the back plate 102 is rotated about pivotable connection 122 to provide a proper viewing angle (based on the passenger's preference) for viewing the PED 1. In some embodiments, the proper viewing angle (i.e., the angle θ between the back plate 102 and the base plate 101) is between approximately 0° and approximately 90°.

FIG. 5B shows a partially stowed configuration. In some embodiments, when the portable electronic device holder 100 is no longer necessary, the passenger may rotate the back plate 102 (including the at least one movable arm 103) down toward the base plate 101, which results in the partially stowed configuration. In some cases, when in the partially stowed configuration, the portable electronic device holder 100 may function as a shelf. The entire portable electronic device holder 100 may be rotated about the rear attachment 114 to the fully stowed configuration, as shown in FIG. 5C. The portable electronic device holder 100 may folded flat against the rear surface 11 of the passenger seat 10. In some embodiments, in the fully stowed configuration, the lower surface 113 of the base plate 101 is approximately flush with the rear surface 11 of the passenger seat 10. To the extent that portions of the these respective components are flat, the lower surface 113 of the base plate 101 may be approximately coplanar with the rear surface 11 of the passenger seat 10 when the portable electronic device holder 100 is in the fully stowed configuration. In some embodiments, the rear surface 11 of the passenger seat 10 may include a recess that approximately corresponds to a size of the portable electronic device holder 100.

If the at least one movable arm 103 is capable of rotating between an extended configuration and a retracted configuration, the movable arm 103 may be moved to the retracted configuration (see FIGS. 4A and 4B) when the portable electronic device holder 100 is moved to the partially stowed or the fully stowed configuration.

The components of the portable electronic device holder 100 may be formed of materials including, but not limited to, aluminum, steel, titanium, carbon composite, graphite composite, polyester, nylon, plastic, thermoplastic, fabric materials, stainless steel, other plastic or polymer materials, other metallic materials, other composite materials, or other similar materials. Moreover, the components of the portable electronic device holder 100 may be attached to one another via suitable fasteners, which include, but are not limited to, screws, bolts, rivets, or other mechanical or chemical fasteners.

In the following, further examples are described to facilitate understanding of aspects of the invention:

Example A. A portable electronic device holder for a passenger seat comprising:
a base plate;
a back plate pivotally attached to the base plate; and
at least one movable arm attached to the back plate,
wherein the back plate is adjustable relative to the base plate over a range of approximately 0° to 90°.

Example B. The portable electronic device holder of Example A or any of the preceding or subsequent examples, further comprising a stowed configuration and a deployed configuration.

Example C. The portable electronic device holder of Example B or any of the preceding or subsequent examples, wherein the at least one movable arm folds relative to back plate to reduce a thickness of the portable electronic device holder in the stowed configuration.

Example D. The portable electronic device holder of Example B or any of the preceding or subsequent examples, wherein, in the stowed configuration, the base plate and the back plate are approximately parallel to one another.

Example E. The portable electronic device holder of Example B or any of the preceding or subsequent examples, wherein the base plate is attached to the passenger seat.

Example F. The portable electronic device holder of Example E or any of the preceding or subsequent examples, wherein the attachment between the base plate and the passenger seat comprises a rotational joint such that, in the stowed configuration, the portable electronic device holder is folded flat against a surface of a seatback of the passenger seat.

Example G. The portable electronic device holder of Example A or any of the preceding or subsequent examples, wherein a forward edge of the base plate comprises an upstanding lip.

Example H. The portable electronic device holder of Example A or any of the preceding or subsequent examples, wherein the at least one movable arm is attached to an upper edge of the back plate.

Example I. The portable electronic device holder of Example A or any of the preceding or subsequent examples, wherein the at least one movable arm slides along a width of the back plate.

Example J. The portable electronic device holder of Example A or any of the preceding or subsequent examples, wherein the at least one movable arm comprises an inner surface with a varying width such that the at least one movable arm is narrower at a proximal end to the back plate.

Example K. The portable electronic device holder of Example A or any of the preceding or subsequent examples, wherein the at least one movable arm comprises two movable arms that each slide along an upper edge of the back plate.

Example L. A passenger seat comprising:
a seat back; and
a portable electronic device holder comprising:
a base plate attached to the seat back;
a back plate pivotally attached to the base plate; and
at least one movable arm attached to the back plate,
wherein an angle of the back plate is adjustable relative to the base plate.

Example M. The passenger seat of Example L or any of the preceding or subsequent examples, wherein the portable electronic device holder comprises a stowed configuration and a deployed configuration.

Example N. The passenger seat of Example M or any of the preceding or subsequent examples, wherein the at least one movable arm folds relative to back plate to reduce a thickness of the portable electronic device holder in the stowed configuration.

Example O. The passenger seat of Example M or any of the preceding or subsequent examples, wherein, in the stowed configuration, the base plate and the back plate are approximately parallel to one another.

Example P. The passenger seat of Example M or any of the preceding or subsequent examples, wherein the attachment between the base plate and the passenger seat comprises a rotational joint such that, in the stowed configuration, the portable electronic device holder is folded flat against a surface of a seatback of the passenger seat.

Example Q. The passenger seat of Example L or any of the preceding or subsequent examples, wherein a forward edge of the base plate comprises an upstanding lip.

Example R. The passenger seat of Example L or any of the preceding or subsequent examples, wherein the at least one movable arm is attached to an upper edge of the back plate.

Example S. The passenger seat of Example L or any of the preceding or subsequent examples, wherein the at least one movable arm slides along a width of the back plate.

Example T. The passenger seat of Example L or any of the preceding or subsequent examples, wherein the at least one movable arm comprises an inner surface with a varying width such that the at least one movable arm is narrower at a proximal end to the back plate.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A portable electronic device holder for a passenger seat comprising:
a base plate;
a back plate pivotally attached to the base plate; and
at least one movable arm attached to the back plate, the at least one movable arm movable along the back plate, wherein the back plate is adjustable relative to the base plate over a range of approximately 0° to 90°, the at least one movable arm comprising a body, an inner surface extending outwards from the body, and an outer lip extending from the inner surface, wherein the at least one movable arm is configured to receive a side edge of a portable electronic device holder in a receiving area defined by the body, the inner surface, and the outer lip and such that the outer lip at least partially overlaps an outward-facing surface of the portable electronic device holder,
wherein the inner surface of the at least one movable arm comprises a varying width such that the at least one movable arm is narrower at a proximal end to the back plate.

2. The portable electronic device holder of claim 1, further comprising a stowed configuration and a deployed configuration.

3. The portable electronic device holder of claim 2, wherein the at least one movable arm folds relative to back plate to reduce a thickness of the portable electronic device holder in the stowed configuration.

4. The portable electronic device holder of claim 2, wherein, in the stowed configuration, the base plate and the back plate are approximately parallel to one another.

5. The portable electronic device holder of claim 2, wherein the base plate is attached to the passenger seat.

6. The portable electronic device holder of claim 5, wherein a rotational joint attaches the base plate and the passenger seat, and wherein, in the stowed configuration, the portable electronic device holder is folded flat against a surface of a seatback of the passenger seat.

7. The portable electronic device holder of claim 1, wherein a forward edge of the base plate comprises an upstanding lip.

8. The portable electronic device holder of claim 1, wherein the at least one movable arm is attached to an upper edge of the back plate.

9. The portable electronic device holder of claim 1, wherein the at least one movable arm slides along a width of the back plate.

10. The portable electronic device holder of claim 1, wherein the at least one movable arm comprises two movable arms that each slide along an upper edge of the back plate.

11. A passenger seat comprising:
a seat back; and
a portable electronic device holder comprising:
    a base plate attached to the seat back;
    a back plate pivotally attached to the base plate; and
    at least one movable arm attached to the back plate, the at least one movable arm movable along the back plate, the at least one movable arm comprising a body, an inner surface extending outwards from the body, and an outer lip extending from the inner surface, wherein the at least one movable arm is configured to receive a side edge of a portable electronic device holder in a receiving area defined by the body, the inner surface, and the outer lip and such that the outer lip at least partially overlaps an outward-facing surface of the portable electronic device holder,
    wherein an angle of the back plate is adjustable relative to the base plate,
    wherein the inner surface of the at least one movable arm comprises a varying width such that the at least one movable arm is narrower at a proximal end to the back plate.

12. The passenger seat of claim 11, wherein the portable electronic device holder comprises a stowed configuration and a deployed configuration.

13. The passenger seat of claim 12, wherein the at least one movable arm folds relative to back plate to reduce a thickness of the portable electronic device holder in the stowed configuration.

14. The passenger seat of claim 12, wherein, in the stowed configuration, the base plate and the back plate are approximately parallel to one another.

15. The passenger seat of claim 12, wherein the attachment between the base plate and the passenger seat comprises a rotational joint such that, in the stowed configuration, the portable electronic device holder is folded flat against a surface of a seatback of the passenger seat.

16. The passenger seat of claim 11, wherein a forward edge of the base plate comprises an upstanding lip.

17. The passenger seat of claim 11, wherein the at least one movable arm is attached to an upper edge of the back plate.

18. The passenger seat of claim 11, wherein the at least one movable arm slides along a width of the back plate.

* * * * *